United States Patent [19]
Klinger

[11] Patent Number: 5,226,230
[45] Date of Patent: Jul. 13, 1993

[54] UNIVERSAL O.D. RELEASE TOOL

[75] Inventor: Gary Klinger, Allen Park, Mich.

[73] Assignee: ITT Corporation, New York, N.Y.

[21] Appl. No.: 807,288

[22] Filed: Dec. 13, 1991

[51] Int. Cl.⁵ .............................................. F16L 35/00
[52] U.S. Cl. ........................................ 29/237; 29/268
[58] Field of Search ............ 81/3.8, 13, 53.11, 424.5, 81/427; 7/125, 126; 29/268, 235, 237, 272, 270; 294/99.1, 99.2, 33

[56] References Cited

U.S. PATENT DOCUMENTS

| | | | |
|---|---|---|---|
| 2,021,241 | 12/1934 | Mall . | |
| 3,215,006 | 11/1965 | Urani | 81/3.8 |
| 3,654,824 | 4/1972 | Reed | 81/3.8 |
| 3,698,742 | 10/1972 | Jones et al. . | |
| 4,244,608 | 1/1981 | Stuemky . | |
| 4,414,698 | 11/1983 | Epstein | 81/3.8 |
| 4,423,892 | 1/1984 | Bartholomew . | |
| 4,697,832 | 10/1987 | Dickirson . | |
| 4,768,271 | 9/1988 | Jacob et al. | 29/270 |
| 4,781,400 | 11/1988 | Cunningham . | |
| 4,793,639 | 12/1988 | Glover . | |
| 4,927,185 | 5/1990 | McNaughton . | |
| 4,946,205 | 8/1990 | Washizu . | |

FOREIGN PATENT DOCUMENTS 1-148191 10/1989 Japan .

*Primary Examiner*—Robert C. Watson
*Attorney, Agent, or Firm*—Robert P. Seitter; J. Gordon Lewis

[57] ABSTRACT

A tool for releasing a male fitting from a mating female connector coupled together by a retaining element includes an elongated H-shaped handle, a bifurcated body including complementary body halves resiliently carried by one end of the handle in a spaced-apart relationship which embraces an outer surface of the connector in a fixed orientation substantially overlying a radial opening therein which exposes the retaining element, and an abutment member which extends from one or both of the body halves operable to radially penetrate the opening to displace the retaining element from an engaged position to an O.D. release position. A second bifurcated body including a second set of complementary body halves is carried on the other end of the handle. Finger members carried by the second body axially engages the retaining element to effect I.D. release of the connector.

15 Claims, 4 Drawing Sheets

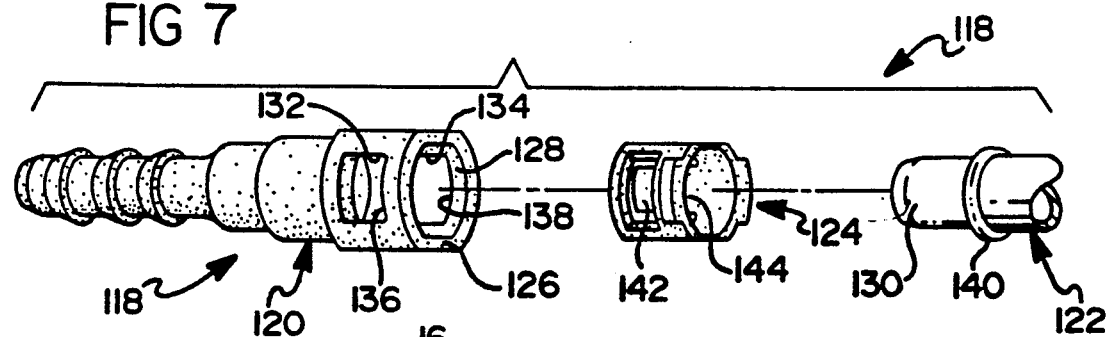

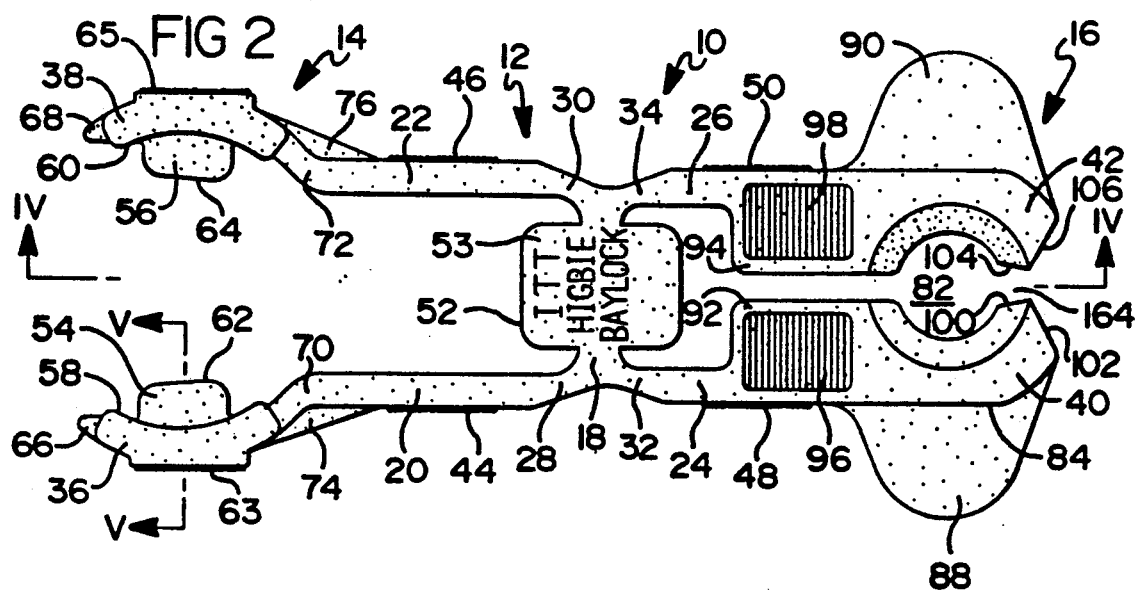
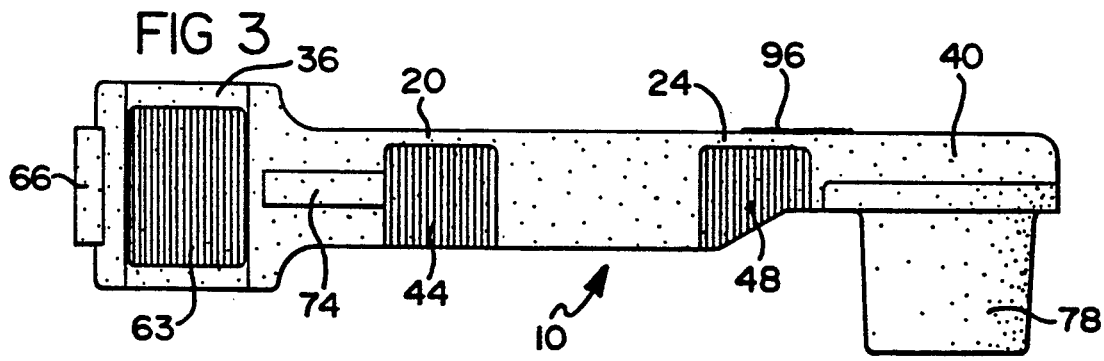
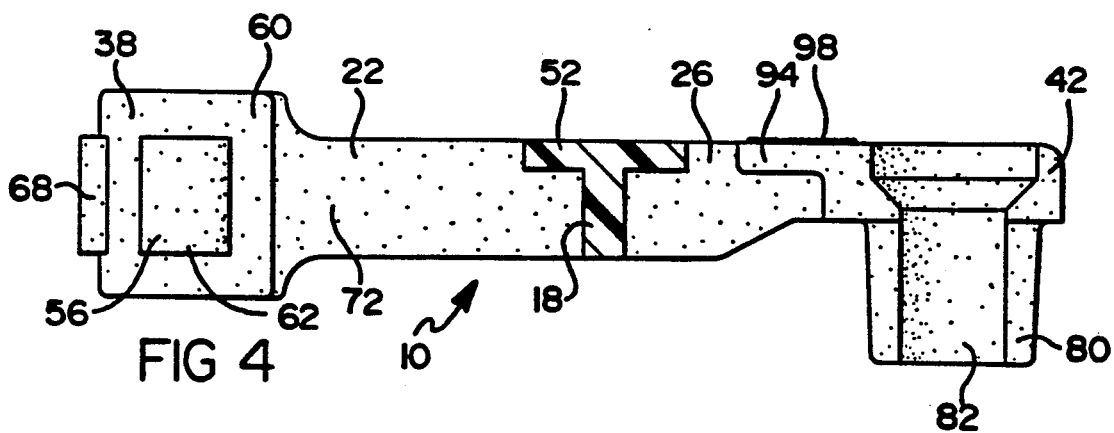

UNIVERSAL O.D. RELEASE TOOL

INTRODUCTION

The present invention relates to application specific hand tools employed to reconfigure mechanical assemblies and, more particularly, to release tools employed to de-couple fittings from mating connectors. More particularly still, the present invention relates to tools adapted for releasing tubular male conduit fittings from mating female connectors.

CROSS REFERENCE

The present invention is related to a copending U.S. application filed on even date herewith entitled "O.D. - I.D. Combination Release Tool", U.S. Ser. No. 807,533 now U.S. Pat. No. 5,187,851 having common inventors and assignee of interest. Furthermore, the present invention is related to U.S. Ser. No. 07/629,933 filed Dec. 19, 1990 now U.S. Pat. No. 5,084,954 and entitle "Quick Connector Universal Release Tool".

BACKGROUND OF THE INVENTION

Quick connectors have long been used to facilitate assembly of mechanical devices without the use of special tooling. This is particularly true in complex automotive systems wherein numerous fluid conduit interconnections are required. In the design of quick connectors used in the industry today, it is sometimes desirable to incorporate an inaccessible retaining mechanism with the fitting. Since the retainer is non-accessible, a tool is needed to open the retainer fingers and thus allow the male fitting to be removed from the female housing. Although tools adapted for release of quick connector type fittings are known, they suffer from a number of infirmities and no design has yet received widespread acceptance. Because quick connect fittings are used on a range of standard tube sizes (typically ¼", 5/16" and ⅜" outside diameter), prior approaches have been to provide a separate special tool for each tube size. Additionally, design differences between quick connect fittings of the same size from one manufacturer to another have necessitated different tools or the application of a tool in very precise positional relationship with respect to the fitting to effect the de-coupling. This has proved extremely inconvenient and such tools are not widely used.

Secondly, release tools have frequently been difficult to manipulate due to the small size of the fittings and the relatively high pull apart forces involved. Known tools have tended to be fragile and easily broken, even with proper use, thereby further discouraging their acceptance. A related shortcoming of known tools is in their requirement for two hand operation which is particularly difficult in many installations where access is limited.

In the design of quick connectors used in the industry today, it is sometimes desirable to place the connector in such an orientation so as to make the open female end inaccessible. Since it is impossible to create an expanding force on the I.D. of the retainer fingers to release the male tube in such cases, a tool is need to collapse the retaining fingers inwardly and free the tube and retainer as a single unit. A current approach in use make use of a forked structure that slides on a grooved portion of the quick connector to create the collapsing motion on the retainer fingers. This grooved track creates weak spots in the housing material and adversely effects the overall connector performance. The design is also exclusive of such connector size and design and requires that the groove track be molded into the female housing. Therefore, it cannot be used with any currently manufactured plastic quick connectors already in the field.

BRIEF DESCRIPTION OF THE INVENTION

The present invention overcomes many of the above described shortcomings of prior art quick connector release tools by providing a single tool with universal application, fitting the majority of standard tube sizes as well as both metal and plastic type quick connectors of most known configurations. Furthermore, the present invention provides an inexpensive tool of robust design which can easily be held and manipulated by one hand.

According to the present invention, a tool which is adapted for releasing male fittings from mating female connectors coupled together by a retaining element includes an elongated handle and a bifurcated body including first and second complimentary body halves which are resiliently carried by the handle in a spaced-apart relationship which, in application, embrace an outer surface of the connector in a fixed orientation to substantially overlie radial openings formed therein to provide external accessibility to the retaining element. Lastly, an abutment member extends from one or both of the body halves which, in application, penetrates the female connector opening(s) to displace the retaining element from an engaged position to a released position to effect release of the fitting from the connector.

In the preferred embodiment of the invention, the bifurcated body includes first and second complimentary body halves which are resiliently carried by the handle. Further, an abutment member extends from each body half which cooperate, in application, to penetrate their respective openings to displace the retaining element towards its release position. This arrangement has the advantage of providing simple construction and one hand operation.

According to another aspect of the invention, the body halves define flange surfaces which circumscribe the abutment members to limit penetration of the abutment members within the openings. This arrangement provides a degree of self-gauging of the tool and necessitates relatively little attention of the operator.

According to another aspect of the invention, the abutment members have characteristic peripheral profiles which are similar to and slightly smaller than that of the openings whereby the abutment members and flange surfaces cooperate to guide the tool to a predetermined orientation with respect to the female connector. This arrangement provides the advantage of allowing use of the tool without close observation of the user, such as in close conditions typically found in an automobile environment.

According to yet another aspect of the invention, a locator nose is provided which extends from the body halves away from the handle which, in application, is operative to initiate engagement with the female connector and momentarily engage at least one of the openings to limit relative axially movement therebetween. This arrangement provides the advantage of rapidly pre-aligning the tool with the female connector during the engagement process.

According to still another aspect of the invention, the abutment members define opposed abutment surface which are generally diverging when the tool is at an at-rest condition and which, in application, are re-positioned to a substantially parallel orientation when displacing the retainer to its release position. This arrangement has the advantage of radially guiding the tool towards its engaged position with the female connector and thereafter to displace the retaining element from its engaged position to its release position while maintaining line contact therebetween and thereby minimize the chance of distortion or rotation of portions of the retaining element during the release process.

According to yet another aspect of the invention, the handle, body and abutment members are integrally formed from a homogeneous material such as plastic. This arrangement has the advantage of providing extremely low unit cost.

Still another aspect of the present invention, includes a generally H-shaped handle including a base portion and generally parallel resilient arm portions extending therefrom and wherein the complementary body halves are carried by corresponding free ends of the arm portions. This arrangement has the advantage of simple design and a handle which inherently resiliently positions the body halves with respect to one another and permits their momentarily displacement, in application, as the tool is mounted on the female connector.

According to still another aspect of the present invention, the handle is provided with a through passage for receiving a tether or other suitable member to ensure against loss. This arrangement has the advantage of providing a more robust design to the handle as well as allows the tool to be attached or supported from another device.

These and other features and advantages of this invention will become apparent upon reading the following specification, which along with the drawings describes and discloses a preferred and alternative embodiment of the invention in detail.

BRIEF DESCRIPTION OF THE DRAWINGS

FIG. 1, is a perspective view of the preferred embodiment of the universal release tool according to the present invention;

FIG. 2, is a top plan view of an enlarged scale of the tool of FIG. 1;

FIG. 3, is a side plan view of the tool of FIG. 2;

FIG. 4, is a cross-sectional view taken on line IV—IV of FIG. 2;

FIG. 5, is a cross-sectional view taken on line V—V of FIG. 2;

FIG. 6, is a perspective view of the preferred embodiment of the present invention in use;

FIG. 7, is an exploded, perspective view of a typical plastic bodied quick connector assembly with which the tool of the present invention is employed;

FIG. 15, is an alternative embodiment of the present invention.

DETAILED DESCRIPTION OF THE PREFERRED AND ALTERNATIVE EMBODIMENTS

Figure 8:
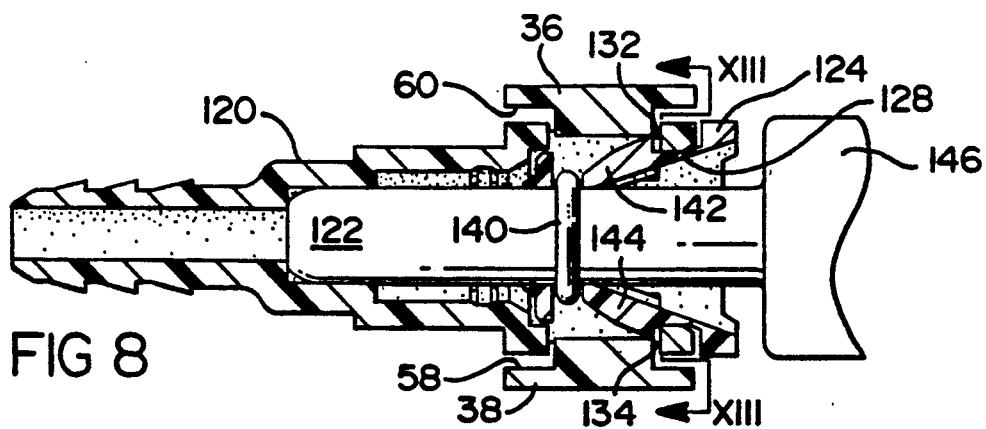
FIG. 8, is a broken, partial section view of the present invention in application with the quick connector of FIG. 7, with the male fitting and female connector in the latched condition.

Referring to FIGS. 1 through 5, a universal quick connector O.D. release tool, shown generally at 10, includes an elongated handle portion 12, a first body portion 14 configured to effect outside diameter (O.D) release of conventional quick connect fittings, and a second body portion 16 configured to effect inner diameter (I.D.) release of such fittings. Handle 12 is generally H-shaped, including a base 18 and four generally parallel arms 20, 22, 24, and 26 extending therefrom. Base 18 and arms 20, 22 or, alternatively, base 18 and arms 24, 26 are deemed to form generally U-shaped handle portions. The junctures of arms 20, 22, 24, and 26 with base 18 each have a reduced section and comprises a resilient hinge 28, 30, 32, and 34, respectively. Arms 22 and 26 are in approximate alignment as are arms 20 and 24. The free ends of arms 20, 22 each support first body halves 36, 38, respectively comprising first body portion 14. Likewise, arms 24, 26 each support second body halves 40, 42 respectively, comprising second body portion 16. Arms 20, 22, 24, and 26 are generally rectangular in cross-section and each define a finger grip 44, 46, 48, and 50, respectively, on an outer surface thereof approximately midway therealong. Base 18 supports a generally rectangular placque 52 bearing informational, advertising or other indicia 53.

Each first body half 36, 38 supports an inwardly directed abutment member 54, 56 located centrally thereon and has a generally rectangular characteristic peripheral profile (see FIG. 4). The inside surface of first body halves 36, 3 8 is partially cylindrical, having a constant radius which corresponds with the outer diameter of the mid-range female connector to be employed with tool 10 as will be described in detail hereinbelow. The inner surfaces of body halves 36, 38 define generally cylindrical flange surfaces 58, 60 which operate to selectively embrace the outer circumferential surface of a female connector as will be described in detail hereinbelow. The opposed, outer surfaces of first body halves 36, 38 form finger grips 63, 65, respectively. The innermost surfaces of abutment members 54, 56 form abutment surfaces 62, 64 which, in the position illustrated in FIG. 2, at rest, are configured to be slightly diverging from one another and from the center line of elongation of handle portion 12. Nose protrusions 66, 68 extend leftwardly from first body halves 36, 38 and converge slightly inwardly. Arms 20, 22 each form an outwardly directing dog leg 70, 72 at their respective points of transition into first body halves 36, 38. Support ribs 74, 76 reinforce dog leg 70, 72, respectively.

Each second body half 40, 42 supports a generally acurate finger member 78, 80, respectively. Finger members 78, 80 are circumferentially spaced to define a constant diameter fitting receiving passageway 82 having an axis which is angularly off-set from the line of elongation of handle 11 to provide clearance from an associated coupling as will be described in detail hereinbelow. Finger member 78, 80 are relatively flexible and spaced from one another and are thus subject to limited radial displacement. As illustrated, passageway 82 corresponds with the nominal outside diameter of an associated male fitting conduit of a certain diameter. However, it is contemplated that multiple finger members 78, 80 could be employed and passageway 82 tapered as described in U.S. Ser. No. 07/629,933 to render the I.D. portion of tool 10 universal as well as the O.D. portion. Each finger member 78, 80 is coextensive with the other and, in a preferred embodiment of the invention, has a characteristic radius which remains constant. The variants discussed in U.S. Ser. No. 07/629,933 could be adopted herein and, thus, the application is incorporated herein by reference.

As best viewed in FIG. 1, on the free ends of arms 24, 26, respectively, on the side thereof opposite lateral sides 84, 86 of the free ends of arms 24, 26, respectively, form a pinch point for squeezing the free ends of arms 24, 26 together. Semicircular laterally extending finger tabs 88, 90 depend from the free ends of arms 24, 26, respectively, and serve as a pinch point for urging tool 10 along fitting receiving passageway 82. Generally rectangular webs 92, 94 are formed at the point of transition between arms 24, 26 and second body halves 40, 42, respectively to provide rigidity and to form finger grips 96, 98, respectively, on the top surfaces thereof. Alternating converging and diverging surfaces or chamfers 100, 102 and 104, 106, are formed on second body halves 40, 42, respectively, to enhance engagement with an associated quick connect fitting.

Tool 10 is ergonomically optimized to be held in a single human hand 108. Although handle portion 12 cooperates with first and second body portions 14 and 16, respectively, to perform differing functions, tool 10, is deemed to be a single tool in that arms 22 and 26 function as a single lever as do arms 20 and 24. As viewed in FIG. 6, tool 10 is held in hand 108 for use of second body portion 16 for I.D. release of an associated fitting while first body portion 14 provides gripping/guiding surfaces. In this configuration, tool 10 is retained by the user's index finger and thumb grasping finger grip 48 and 50, respectively, for the application of squeezing forces as indicated by arrows 110 and 112, respectively. Simultaneously, arms 22 and 20 as well as first body portion 14 are captured within the palm of hand 108 for stability and leverage. Specifically, the middle finger and the base of the thumb of hand 108 bear respectively against grips 63 and 65, respectively as indicated by arrows 114 and 116, respectively, in a squeezing motion. When first body portions 36 and 38 are pressed together, they, along with arms 20, 22, 24 and 26 serve as a handle which via hinges 28, 30, 32, and 34, tend to slightly separate second body halves 40 and 42 in anticipation of engaging the male fitting of an associated coupling as well as to provide two spaced pressure points to facilitate manipulation of tool 10. Thus, by alternating application of forces at arrows 110 and 112 and then 114 and 116, tool 10 can be operated somewhat in a scissors fashion pivoting about base 18 subject to the resiliency of the material itself as well as the flexibility of the hinge points 28, 30, 32, and 34 and base 18. Tool 10 is construded symmetrically about the axis of elongation of handle portion 12 to enhance utility whereby it can be held in either hand and approach an associated fitting from any direction.

When first body portion 14 is to be employed to effect O.D. release of an associated coupling, tool 10 would be reversed from the position illustrated in FIG. 6 in which the thumb and index finger of hand 108 would abut finger grip 63 or 44 and 65 or 46, respectively and middle finger and thumb base would contact finger grip 50 and 48 and/or second body portion 16, respectively.

Referring to FIG. 7, an exploded view of a typical quick connect coupling assembly 118 for which the release tool 10 would be employed is illustrated. Assembly 118 includes a female connector body 120, a male tubular fitting 122 and a retainer 124. Female body 120 has generally tubular construction of injection molded plastic or other suitable material and includes an enlarged end 126 forming an opening 128 for receiving an end 130 of male fitting 122 therein. Opposed radially extending passageways 132 and 134 provide external radial accessibility to the interior of enlarged end 126. Passageways 132 and 134 are generally rectangular in shape and the leading edge thereof (as viewed in FIG. 7) forms an abutment surface 136, 138, respectively. A circumferential flange 140 formed on male fitting 122 adjacent end 130 provides a second abutment surface. Retainer 124 includes two paddle-like axially extending retainer tabs 142, 144 which co-act with abutment surfaces 136 and 138 and flange 140 to effect coupling together of female body 120 and male fitting 122.

Referring to FIGS. 8, 9, and 12 through 14, a typical application of tool 10 to effect an O.D. release of coupling assembly 118 is illustrated. By way of example, O.D. release may be required when male fitting 122 is integrally formed with a large diameter disposable fuel filter 146 which is close coupled to opening 128 of female connector body 120 preventing axial access thereto. As viewed in FIG. 8, retainer 124 maintains female body 120 and male fitting 122 in an engaged condition whereby retaining tabs 142, 144 define a leftwardly facing abutment surface 148, 150 engaging the right-hand most surface of flange 140, as well as rightwardly facing abutment surfaces 152, 154 engaging abutment surfaces 136, 138 of female body 120, respectively, to prevent relative axial displacement between female body 120 and male fitting 122.

Figure 12:
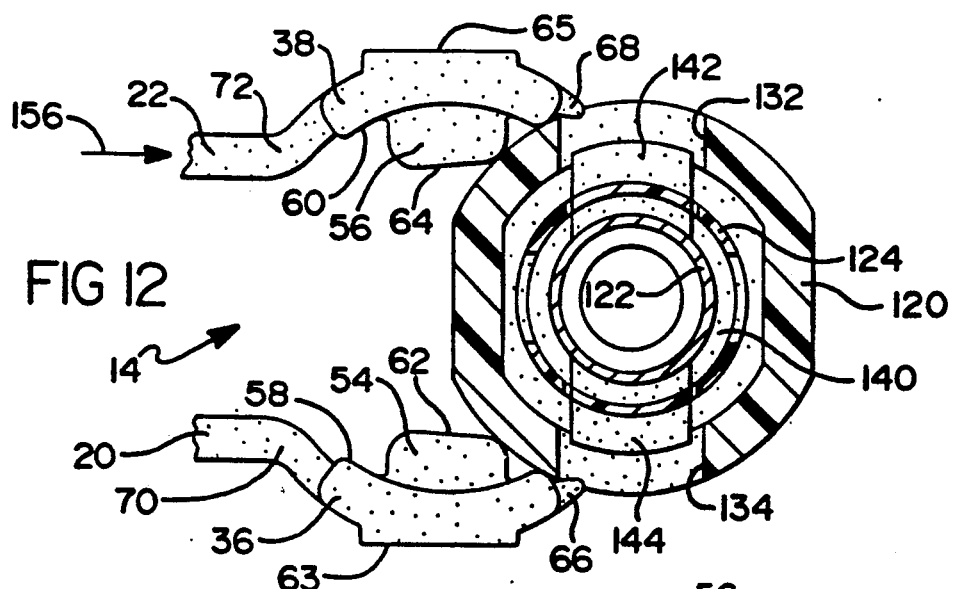
FIG. 12, corresponds to a cross-sectional view taken on lines XIII—XIII of FIG. 8, but with the release tool in its pre-positioning orientation.
Figure 13:
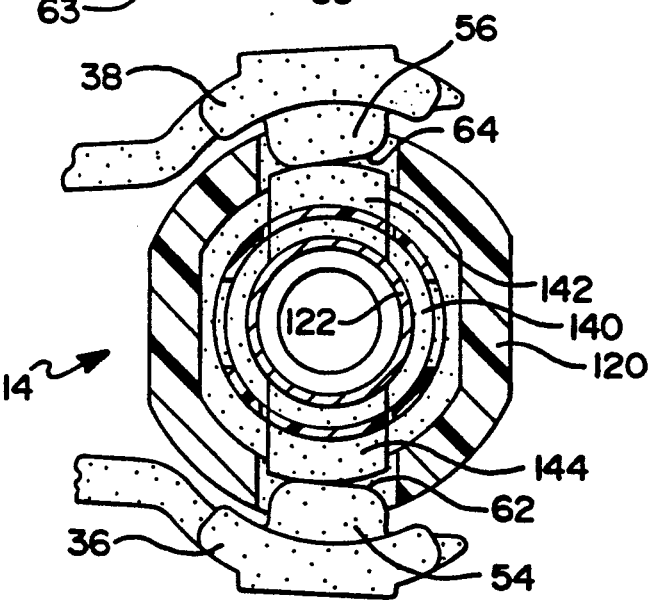
FIG. 13, is a cross-sectional view taken on lines XIII—XIII of FIG. 8.

Referring to FIG. 12, O.D. release is initiated by positioning tool 10 generally normal to female body 120 adjacent its enlarged end 126 and probing with nose protrusions 66, 68 to locate passageways 132, 134. Inasmuch as nose protrusions 66, 68 have substantially similar lateral dimensions as the axial width of passageways 132, 134, once located as illustrated in FIG. 12, nose protrusions 66, 68 will snap resiliently into their illustrated position to axially fix tool 10 with respect to female body 120. Thereafter, the application of rightward force as indicated by arrow 156 will transition tool 10 from the position illustrated in FIG. 12 to the position illustrated in FIG. 13 wherein abutment members 54, 56 self-locate within passageways 132, 134. In so doing, abutment members 54, 56 engage the edges of female body 120 defining passageways 132, 134 to correct any slight shewing or mis-alignment of handle portion 12 with respect to female body 120. When positioned as illustrated in FIG. 13, first body halves 36, 38 are spaced radially outwardly from the outer surface of female body 120 by a distance which is equal or slightly greater than the degree of radial purchase of abutment surfaces 152, 154 upon abutment surfaces 135, 138. As illustrated in FIGS. 8 and 13, abutment surfaces 62, 64 establish a line contact with the radially outermost edge of retaining tabs 142, 144 at the point wherein they transition into abutment surfaces 152, 154, respectively. Surfaces 62, 64 remain in a slightly outwardly converging orientation with respect to an imaginery center line of tool 10.

Figure 9:
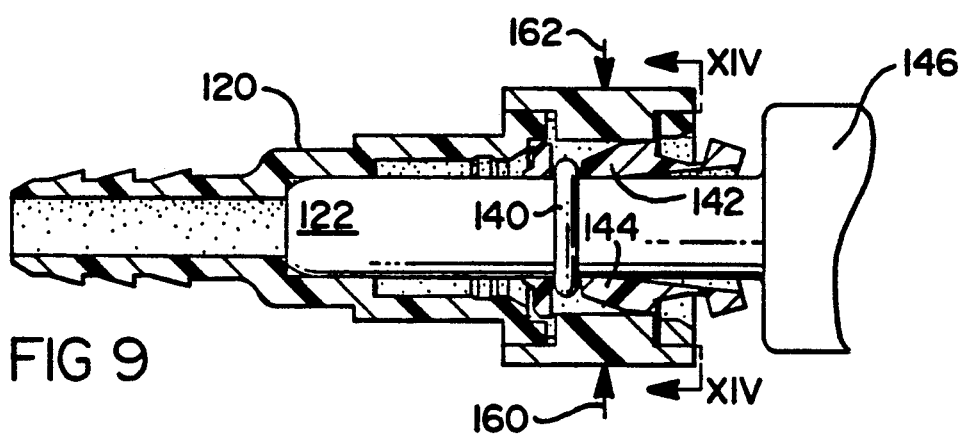
FIG. 9, represents the application of FIG. 8, with the tool having displaced the retaining element of the fitting radially inwardly to release the male fitting and retaining element from the female connector.
Figure 14:
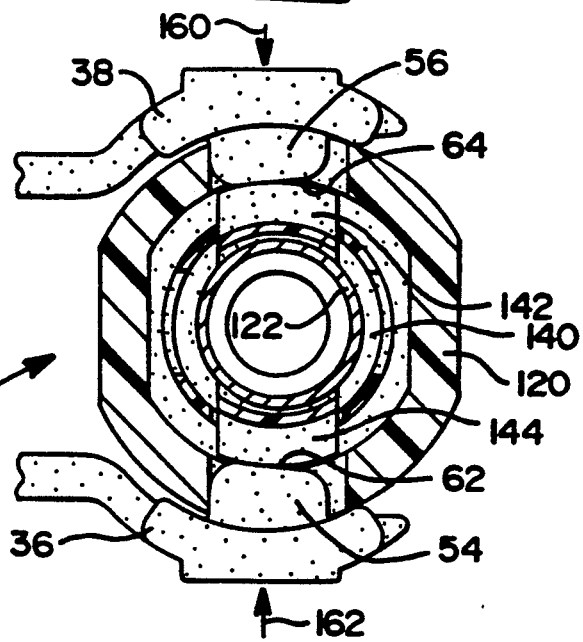
FIG. 14, is a cross-sectional view taken on lines XIV—XIV of FIG. 9.

To effect O.D. release, radially inwardly opposed forces are applied as indicated by arrows 160 and 162 against finger grips 63, 65 to displace first body halves 36, 38 to their illustrated positions in FIG. 14 wherein flange surfaces 58, 60 abut the outer circumferential surface of enlarged end 126 of female body 120 to limit radial penetration of abutment members 54, 56 within passageways 132, 134 and to ensure the maintenance of precise positional orientation of tool 10 with respect to female body 120. As best illustrated in FIG. 9, displacement of body halves 36, 38 to their illustrated release position rotationally displaces retaining tabs 142, 144 radially inwardly to disengage abutting surfaces 152, 154 from surfaces 136, 138. In transitioning between the positions illustrated in FIGS. 8 and 9, body halves 36, 38 rotate slightly about their respective hinge points 28, 20, to effect approximate parallel alignment of abutment surfaces 62, 64. Because retainer 124 is formed of inherently resilient material, once its release is effected from female body 120, it will tend to move rightwardly as viewed in FIG. 9 to enhance its removal in assembly with male fitting 122. After release of coupling assembly 118, body halves 36, 38 will resiliently return to the position illustrated in FIG. 13 for removal in a direction opposite to that suggested by arrow 156.

Figure 10:
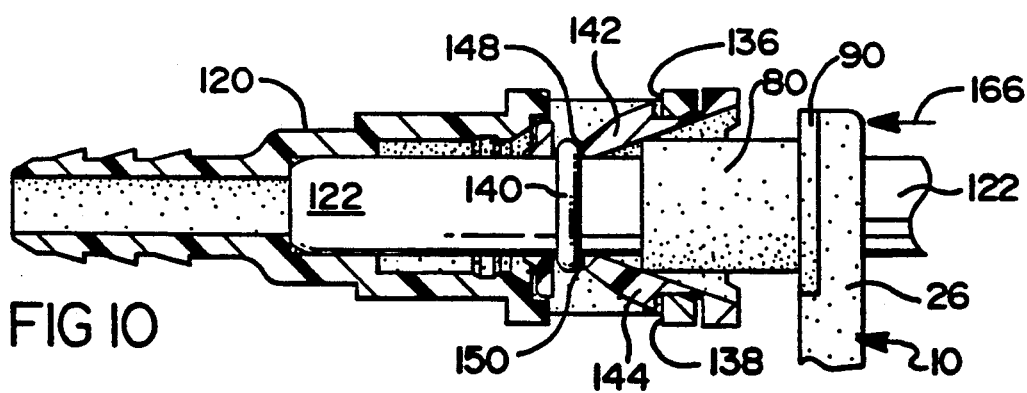
FIG. 10, is a broken, partial section view of the present invention in an alternative application with the quick connector of FIG. 7, with the male fitting and female connector in the latched condition.
Figure 11:
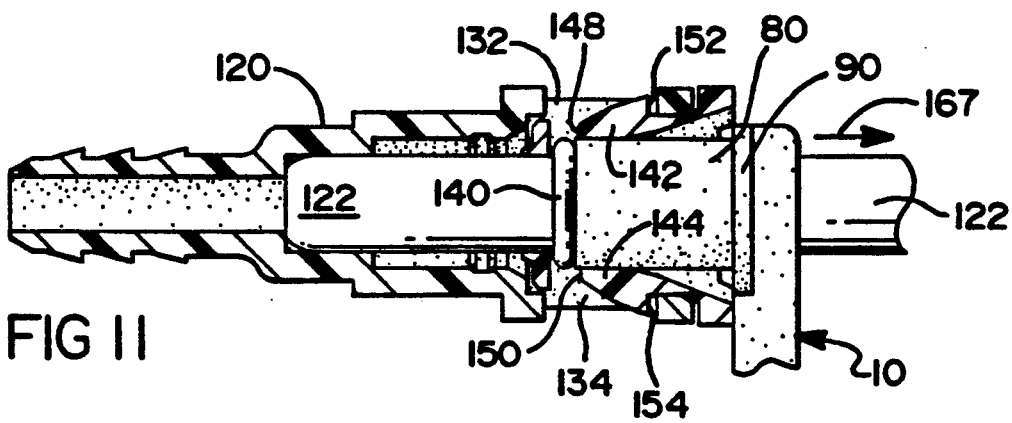
FIG. 11, represents the application of FIG. 10, with the tool having displaced the retaining element of the fitting radially outwardly to release the male fitting for removal from the retaining element and female connector.

Referring to FIGS. 10 and 11, the application of tool 10 in its alternative I.D. release function is illustrated. Again, beginning with a pre-assembled coupling 118, tool 10 is aligned whereby the line of elongation to handle 12 is generally normal to the axis of conduit 122. Thereafter, a V-notch 164 (refer to FIG. 2) within second body portion 16 defined by chamfers 102 and 106 in body halves 40, 42, respectively, is pressed against conduit 122 to momentarily spread the free ends of arms 24, 26 to enable positioning of passageway 82 concentrically with conduit 122 wherein the resilient nature of the material forming arms 24, 26 will cause them to snap back or reassume their illustrated generally parallel orientation. At this point, the radially innermost surfaces of finger member 78, 80 closely abut and substantially circumscribe conduit 122.

Once positioned as illustrated in FIG. 10, tool 10 is displaced leftwardly as indicated by arrow 166 until the leading edge of finger members 78, 80 abut flange 140. In so doing, the outer circumferential surfaces of finger members 78, 80 ramp along the radially innermost surfaces of retainer tabs 142, 144 sufficiently to enable axial removal of male fitting 122 as indicated by arrow 167 in FIG. 11. Upon de-coupling of coupling 188, retainer 124 will remain in assembly with female body 120.

Finger grips 44, 46, 48, 50, 63, 65, 96 and 98, as well as finger tabs 88 and 90 constitute a tactile indicator system which provide the tool user with non-visual cues as to the tool's orientation as well as predetermined force application points as was described hereinabove. The system ensures optimal use of the tool 10, 168, particularly to sight limited application.

In addition to the foregoing functions, it is envisioned that release tool 10 could be applied to release fittings which include an integral release collar as described in U.S. Ser. No. 07/629,933. A detailed description of that process will be deleted here for the sake of brevity.

Referring to FIG. 15, an alternative embodiment of a universal O.D. - I.D. quick connect release tool 168, including a handle portion 170 forming a H-configuration including a base 172 and arms 174, 176, 178, and 180 depending therefrom, is illustrated. The central portion of base 172 has an increased section defining a through passage 182 suitable for receiving a tether such as a beaded chain 184 for securing tool 168 to another object. Laterally extending finger tabs 186, 188 are provided to function as described hereinabove with relation to finger tabs 88, 90 of FIGS. 1–4. Instructional indicia 190 is provided on a top surface of one of both of tabs 186, 188 to aid its user.

It is to be understood that the invention has been described with reference to a specific embodiment and variations to provide the features and advantages previously described in that such embodiments are susceptible of modification as will be apparent to those skilled in the art. For example, it is contemplated that arms 20 and 26 and, separately, arms 22 and 24 could be formed into two relatively rigid structures which are pinned at a pivot point formed in at their respective base portions for sensors-like operation. Accordingly, the foregoing is not be to construed in a limiting sense.

What is claimed is:

1. A tool adapted for releasing a male fitting from a mating female connector coupled together by a retaining element disposed within said female connector and externally accessible through opposed radial openings within the female connector, said tool comprising: a general U-shaped handle including a base portion and generally parallel resilient arm portions extending therefrom;

a bifurcated body including first and second complementary body halves carried by corresponding free ends of said arm portions in a spaced-apart relationship operable, in application, to embrace an outer generally cylindrical surface of said female connector in a fixed, predetermined orientation substantially overlying said openings, and an abutment member extending from each body half, said abutment members cooperating, in application, to radially penetrate said opening a predetermined distance to displace said retaining element from an engaged position to a release position;

said body halves define generally cylindrical flange surfaces circumscribing said abutment members operative to limit penetration of said abutment members within said openings.

2. The tool of claim 1, wherein said abutment members have characteristic peripheral profiles similar to that of said openings.

3. The tool of claim 2, wherein said flange surfaces and abutment members are operable, in application, to interact with said openings and an outside surface of said female connector to guide said tool to a predetermined orientation with respect to said female connector.

4. The tool of claim 1, wherein said handle, body and abutment members are integrally formed from a homogeneous material.

5. The tool of claim 4, wherein said material is plastic.

6. The tool of claim 4, wherein said material is metal.

7. The tool of claim 1, wherein said handle base portion defines a tether receiving through passage.

8. The tool of claim 1, wherein said flange surfaces are substantially cylindrical and extend essentially normally to a line of elongation of said handle.

9. The tool of claim 1, wherein said body halves and abutment members are formed symmetrically.

10. The tool of claim 1, further comprising resilient hinges formed near an intersection between said base portion and each said arm portion.

11. A tool adapted for releasing a male fitting from a mating female connector coupled together by a retaining element disposed within said female connector and externally accessible through opposed radial openings within the female connector, said tool comprising: a generally U-shaped handle including a base portion and generally parallel resilient arm portions extending therefrom:

a bifurcated body including first and second complementary body halves carried by corresponding free ends of said arm portions in a spaced-apart relationship operable, in application, to embrace an outer generally cylindrical surface of said female connector in a fixed, predetermined orientation substantially overlying said openings, an abutment member extending from each body half, said abutment members cooperating, in application, to radially penetrate said opening a predetermined distance to displace said retaining element from an engaged position to a release position, and a locator nose extending from at least one of said body halves away from said handle, said nose operative, in application, to initiate engagement with said female connector and momentarily engage at least one said radial opening to limit relative axial movement therebetween.

12. The tool of claim 11, wherein said nose has a characteristic lateral width substantially equal to a characteristic lateral dimension of said abutment members.

13. The tool of claim 12, wherein one said nose extends from each body half in a generally inwardly converging direction.

14. The tool of claim 1, further comprising opposed, outwardly directed grip surface formed on said body halves.

15. The tool of claim 1, wherein said abutment members define opposed abutment surfaces which are generally diverging in an at-rest condition and, in application, are generally parallel when said retaining element is in said release position.

* * * * *